United States Patent [19]
Stelzer

[11] 3,770,019
[45] Nov. 6, 1973

[54] CONTROL VALVE
[75] Inventor: Raymond F. Stelzer, Bel Nor, Mo.
[73] Assignee: Wagner Electric Corporation, Newark, N.J.
[22] Filed: July 10, 1972
[21] Appl. No.: 270,484

[52] U.S. Cl.................... 137/627.5, 137/85, 303/40
[51] Int. Cl............................................. B60t 13/24
[58] Field of Search........................ 137/627.5, 85; 303/40, 54

[56] References Cited
UNITED STATES PATENTS
3,169,802  2/1965  Chovan............................ 303/40 X
3,224,342  12/1965  Bueler............................. 303/54 X
3,491,785  1/1970  Kay..................................... 137/85

Primary Examiner—Robert G. Nilson
Attorney—James R. Bell

[57] ABSTRACT

A control valve for varying fluid pressure applied to the vehicle front brakes in a braking system is provided with a control piston responsive to control fluid pressure for actuating a relay piston to establish the applied fluid pressure in a predetermined ratio, and a valve actuated by the control and relay pistons when the control fluid pressure acting on the control piston exceeds a predetermined value to effect a metered application of the control fluid pressure to the relay valve for altering the ratio of the applied fluid pressure.

17 Claims, 2 Drawing Figures

3,770,019

CONTROL VALVE

FIELD OF THE INVENTION

This invention relates generally to brake systems for vehicles and in particular to a control valve for varying fluid pressure applied to the vehicle front brakes.

BACKGROUND OF THE INVENTION

In the past vehicle brake systems, the braking capacity between the front and rear axle brakes of a truck or tractor for use with a trailer was usually balanced or divided so that the front axle brakes accomplished 25 to 35 percent of the braking effort and the rear axle brakes accomplished the other 65 to 75 percent of such braking effort. Due to the Newtonian mechanics of decelerating or stopping a vehicle which involves the vehicle length of wheel base, static load distribution, and the height of the vehicle center of gravity from the roadbed, etc., the potential torque increase or increased braking effort of the front axle brakes due to high deceleration vehicle stops can be of such magnitude as to result in front to rear axle brake balance, or redistribution of such brake balance, in the range of 50 percent for the front axle brakes and 50 percent for the rear axle brakes or perhaps even greater. In order to take advantage of the front to rear axle brakes having the capacity to accommodate such redistribution must be provided on the vehicle, such as front axle brakes having significantly greater torque or braking effort generating potential. When the front axle brakes have the aforementioned significantly greater torque or braking effort generating potential was provided on the vehicle, the aforementioned redistribution of front to rear axle braking efforts effected during rather high vehicle decelerations resulted in the following undesirable or disadvantageous features: (1) an increasing tendency for early front wheel skidding; (2) a deleterious affect on vehicle steerability; (3) a deleterious imposition of increased loads or forces on the vehicle front suspension components during braking; and (4) a deleterious imposition of significantly increased loads on the vehicle front tires during braking which results in premature front tire wear. From the foregoing, it is apparent that high levels of front axle brake torque are required to produce high vehicle deceleration rates, but high levels of front axle brake torque can only be utilized if high vehicle decelerations were actually produced; however, this apparent paradox was due to the fact that high vehicle deceleration rates were required to effect sufficient weight transfer to the front axle to effect the utilization of the large magnitudes of front axle torque.

The principal object of the present invention is to provide a control valve for use in a vehicle brake system to predeterminately control fluid pressure applied to the vehicle front axle brakes which overcomes the aforementioned disadvantages or undesirable features, and this, as well as other objects and advantageous features of the present invention, will become apparent from the specification which follows.

SUMMARY OF THE INVENTION

Briefly, the present invention comprises a control valve including control and relay means responsive to a control fluid pressure acting on said control means to effect the application through said control valve of fluid pressure supplied thereto in a predetermined ratio with the control fluid pressure, and modulating means for modulating said control fluid pressure to said relay means to alter the ratio between the applied and control fluid pressures when the control fluid pressure acting on said control means exceeds a predetermined value.

DETAILED DESCRIPTION OF THE INVENTION

Figure 1:
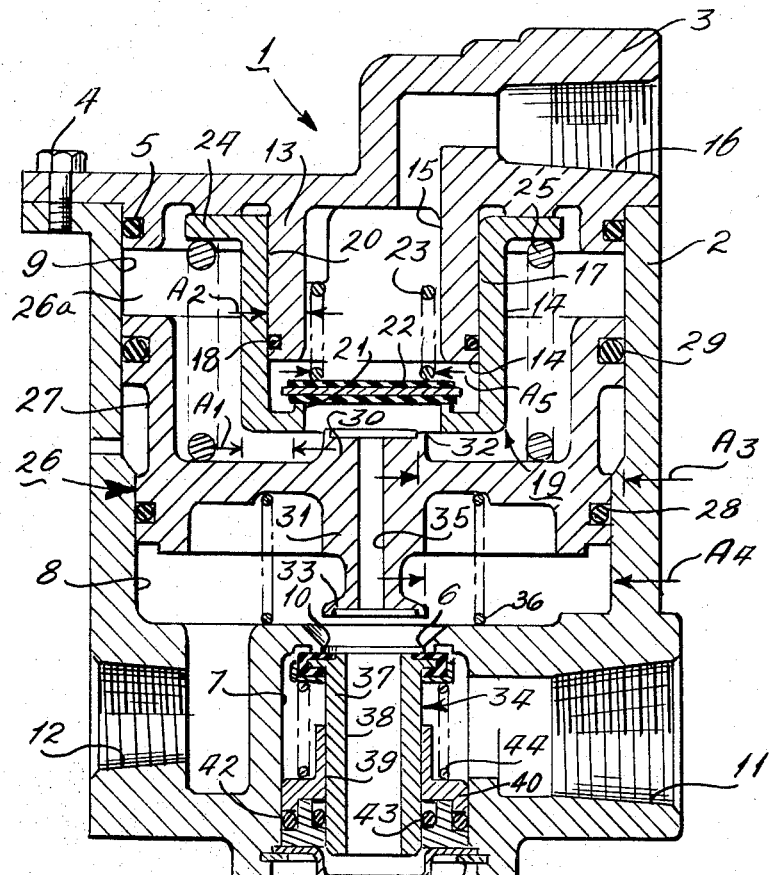
FIG. 1 is a sectional view of a control valve illustrating the preferred embodiment of the present invention in cross-section.

Referring now to the drawings in detail and in particular to FIG. 1, a control valve 1 is provided with a housing 2 having a housing end plate or closure member 3 connected therewith by suitable means, such as a plurality of stud 4, and a seal 5 is sealably interposed between said housing and end plate.

The housing 2 is provided with a bore 6 axially interposed between a lower counterbore 7 and upper stepped counterbores 8, 9, and a valve seat 10 is provided on said housing between the bore and counterbore 6, 7. An inlet port 11 which is adapted for connection with a protected fluid pressure source (not shown) is provided in the housing 2 intersecting with the bore 7, and an outlet port 12 which is adapted for connection with the vehicle front axle brakes (not shown) is also provided in said housing connecting with the counterbore 8 adjacent to the lower end portion thereof. The end plate 3 is provided with a centrally located hub or extension 13 having a free end 14 which extends coaxially into the housing counterbore 9, and a blind bore 15 is provided in said extension intersecting with said free end thereof and connecting with a control port 16 also provided in said end plate which is adapted for connection with a brake system application or foot valve (not shown). A peripheral cylindrical surface 17 is provided on the extension 13, and a peripheral seal 18 is disposed in said surface adjacent to the extension free end 14.

A modulating or metering member, such as the control piston indicated generally at 19, is provided with an axial stepped passage or bore 20 therethrough having a shoulder 21 therebetween defining a valve seat, and the larger of the stepped passages is slidably received on the peripheral surface 17 of the end plate extension 13 in sealing engagement with the seal 18. A modulating valve member 22 is slidably and guidably received in the larger stepped passage 20 of the control piston 19 and normally urged into engagement with the valve seat 21 by the negligible compressive force of a valve spring 23 engaged between said valve member and said end plate extension. A radially extending flange or abutment portion 24 is also provided on the control piston 19 adjacent to the upper end thereof, and said flange is normally urged into abutting engagement with the end plate 3 about the extension 13 thereof by resilient means, such as the spring 25, which is interposed between said flange and an application member, such as the stepped relay piston indicated generally at 26. A chamber 26a is provided in the housing counterbore 9 between the control and relay pistons 19, 26, and the valve member 22 controls pressure fluid communication between the control port 16 and said chamber.

The relay piston 26 is slidably received in the housing stepped counterbore 8 having an integral flange 27 slidably received in the housing stepped counterbore 9, and peripheral seals 28, 29 are carried in said relay piston and flange portion in sealing engagement with said counterbores 8, 9, respectively. Opposed centrally located extensions 30, 31 are integrally provided on the relay piston 26 having free ends 32, 33 defining valve seats for engagement with the valve member 22 and an inlet valve member 34 described hereinafter, respectively, and an exhaust passage 35 is axially provided through said extensions intersecting with said valve seats and connecting with the chamber 26a. A return spring 36 is biased between the housing 2 and the relay piston 26 concertedly urging the control and relay pistons 19, 26 toward their respective inoperative positions, as shown.

The valve member 34 is provided with a stem portion 37 having an exhaust passage 38 therethrough, and said valve member is slidably received in a bore 39 of a valve guide member 40 which is retained against displacement from the lower end of the housing counterbore 7 by a snap ring and groove assembly 41. Seals 42, 43 are carried in the valve guide member 40 in sealing engagement with the housing counterbore 7 and the valve stem 37, and a valve spring 44 of negligible compression force is biased between said valve guide member and the valve member 34 urging said valve member into sealing engagement with the housing valve seat 10 to normally interrupt pressure fluid communication between the inlet and outlet ports 11, 12 and vent said outlet port to the atmosphere through the valve exhaust passage 38.

A pair of opposed effective annular areas $A_3$, $A_4$ are provided on the relay piston 26 between the sealing engagements of the valve seats 32, 33 with the valve members 22, 34 and the sealing engagements of the seals 29, 28 with the counterbores 9, 8, respectively, and the areas $A_3$, $A_4$ are respectively subject to fluid pressure in the chamber 26a and at the outlet port 12, said area $A_3$ being predeterminately greater than the area $A_4$. Another pair of opposed effective annular areas $A_2$, $A_1$ are provided on the control piston 19 between the sealing engagement of valve member 22 with the valve seat 21 and the larger stepped bore 20 and the periphery of said control piston, respectively, and the areas $A_2$, $A_1$ are respectively subjected to the fluid pressure at the control port 16 and in the chamber 26a, said area $A_1$ being predeterminately greater than said area $A_2$. The seating engagement of the valve member 22 with the control piston valve seat 21 defines another effective area $A_5$ subjected to the fluid pressure at the control port 16.

OPERATION

Figure 2:
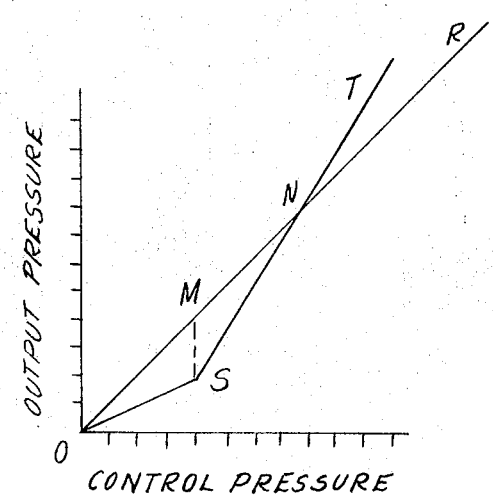
FIG. 2 is a graphical representation illustrating the applied or output fluid pressures effected by the control valve of FIG. 1 in response to the control fluid pressure delivered thereto.

In the operation with the component parts of the control valve 1 positioned as shown in FIG. 1 and as described hereinbefore, control fluid pressure P metered to the control port 16 from the vehicle brake system foot valve (not shown) flows through the hub bore 15 of the end plate 3 into the control piston bore 20 acting on the areas $A_2$, $A_5$ of said control piston and valve member 19, 22, respectively, to establish a control force P ($A_2 + A_5$) which is effective to move said control piston downwardly against the metering spring 25, and, of course, the relay piston 26 is concertedly downwardly movable with said control piston and metering spring toward actuating engagement with the valve member 34. The concerted downward movement of the control and relay pistons 19, 26 along with the metering spring 25 initially engages the extension valve seat 33 of said relay piston with the valve member 34 closing the exhaust passage 38 thereof to isolate the outlet port 12 from the atmosphere and thereafter moves said valve member against its valve spring 44 toward an open of metering position disengaged from the housing valve seat 10 to establish metered pressure fluid communication between the inlet and outlet ports and meter the supplied or input fluid pressure $Pi$ from the inlet chamber 7 through the housing bore and counterbore 6, 8 to establish a metered reduced applied or output fluid pressure $Po$ at the control port 12. The output fluid pressure $Po$ at the outlet port 12 acts on the effective reaction area $A_4$ of the relay piston 26 to establish a reaction force $Po$ $A_4$ which is opposed to the control force P ($A_2 + A_5$), and when the output force $Po$ $A_4$ attains a magnitude equal to that of the control force P ($A_2 + A_5$), the relay piston and valve member 26, 34 are concertedly moved upwardly toward lapped positions with the relay piston valve seat 33 in lapped engagement with said valve member and said valve member in lapped engagement with the housing valve seat 10. From the graphical representation in FIG. 2, it is obvious that increases in the control fluid pressure P less than the predetermined value M, as shown on the line OR, will result in proportionally reduced increases in the output fluid pressure $Po$, as shown by the line OS, in a predetermined ratio with the control fluid pressure P wherein: $Po = [P (A_2 + A_5)]/A_4$.

When the control fluid pressure P at the control port 16 is increased to a value in excess of the predetermined value M, the control force P ($A_2 + A_5$) initially actuates the control piston 19 against the compressive force Fc of the metering spring 25 toward a position engaging the control piston valve member 22 with the relay piston valve seat 32 closing the relay piston exhaust passage 35 to isolate the chamber 26a from the atmosphere. With the valve member 22 engaged with the relay piston valve seat 32, the force P $A_2$ of the control fluid pressure P acting on the area $A_2$ of the control piston 19 urges said control piston against the metering spring 25 toward a metering position disengaging the control piston valve seat 21 from said valve member to effect metered flow of the control fluid pressure P in excess of the predetermined valve M from the control port 16 through the control piston stepped passage 20 into the chamber 26a and establish therein a metered or proportionally reduced control fluid pressure $Pr$. The reduced control fluid pressure $Pr$ in the chamber 26a acts on the area $A_1$ of the control piston 19 to establish a reaction force $Pr$ $A_1$ acting on said control piston in opposition to the force P $A_2$, and the reduced control fluid pressure $Pr$ also acts on the area $A_3$ of the relay piston 26 to establish an additional applying force $Pr$ $A_3$ in opposition to the reaction force $Po$ $A_4$ acting on said relay piston. When the additive metering spring and reaction forces Fc, $Pr$ $A_1$ acting on the control piston 19 balance the control force P $A_2$ in opposition thereto, said control piston is moved upwardly to re-engage or lap the control piston valve seat 21 with the valve member 22 closing the control piston passage 20 and isolating the control port 16 from the chamber 26a, and at the same time the additional force $Pr\ A_3$ assists the control force $P\ (A_2 + A_5)$ in further actuating the relay piston 26 against the reaction forces $Pr\ A_1$, $Po\ A_4$ acting on the control and relay pistons 19, 26 to again disengage the valve member 34 from the housing valve seat 10 and increase the output fluid pressure Po, as previously described. The increase of the output fluid pressure Po effects a corresponding increase in the reaction force $Po\ A_4$, and when the magnitude of the reaction force $Po\ A_4$ is increased to a value additive to the reaction force $Pr\ A_1$ which balances the additive control and additional forces $P\ (A_2 + A_5)$, $Pr\ A_3$, the control and relay pistons 19, 26 are concertedly movable upwardly in the housing counterbores 8, 9 until the valve member 34 is again returned to lapped engagement with the housing and relay piston valve seats 10, 33. From the graphical representation in FIG. 2, it is obvious that increases in the control fluid pressure P in excess of the predetermined value M, as shown in the line OR, will result in proportionally reduced increases in the output fluid pressure, as shown by the line SNT wherein $Po = [P\ (A_2 + A_5) + Pr\ (A_3 - A_1)/A_4]$. It should be noted that when the control and output fluid pressures P, Po attain the predetermined value N, as shown on the line OR, the output fluid pressure Po thereafter increases at a rate greater than that of the control fluid pressure P, as illustrated by the line NT in the graph of FIG. 3.

When the desired vehicle braking effort has been attained by the actuation of the control valve 1 as described hereinbefore, the control fluid pressure P is vented to atmosphere which eliminates the control force $P\ (A_2 + A_5)$ acting on the control piston 19, and the additive spring and control piston reaction forces $Fc$, $Pr\ A_1$ urge said control piston upwardly toward its original position re-engaging the flange 24 with the housing end plate 3. This upward movement of the control piston 19 disengages the valve member 22 from the relay piston valve seat 32 to vent the chamber 26a to atmosphere through the relay piston and valve member exhaust passages 35, 38 which eliminates the additional force $Pr\ A_3$, and the reaction force $Po\ A_4$ acting on the relay piston 26 then urges said relay piston upwardly toward its original position in the housing 2 disengaging the relay piston valve seat 33 from the valve member 34 to vent the output fluid pressure to the atmosphere and eliminates the reaction force $Po\ A_4$.

From the foregoing, it is now apparent that the control valve 1 meeting the objects and advantageous features set forth hereinbefore, as well as others, are disclosed and that changes as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, application means movable in said housing for effecting a metered application therethrough of supplied fluid pressure, resiliently urged means drivingly engaged with application means and subjected to a control fluid pressure, said resiliently urged means being movable in response to control fluid pressure acting thereon less than a predetermined value to drive said application means toward a position in said housing effecting the metered application of the supplied fluid pressure therethrough to establish a metered applied fluid pressure in a predetermined ratio with the control fluid pressure, and said resiliently urged means including means for metering the control fluid pressure in excess of the predetermined value to said application means to effect further metering actuation thereof and alter the predetermined ratio between the control and applied fluid pressures.

2. A control valve comprising a housing, application means movable in said housing for effecting a metered application therethrough of supplied fluid pressure, resiliently urged means drivingly engaged with said application means and adapted to be subjected to a control fluid pressure, said resiliently urged means being initially movable in response to control fluid pressure less than a predetermined value acting thereon to drive said application means toward a position in said housing metering the supplied fluid pressure therethrough to establish a metered applied fluid pressure in a predetermined ratio which the control fluid pressure, an effective area on said application means for subjection to control fluid pressure, and valve means in said resiliently urged means for engagement with said application means and controlling the subjection of the control fluid pressure to said area, said resiliently urged means being further movable in response to control fluid pressure in excess of the predetermined value acting thereon to engage said valve means with said application means and meter control fluid pressure in excess of the predetermined value to said area establishing an assisting force to effect further metering actuation of said application means and increase the metered applied fluid pressure in another predetermined ratio with the control fluid pressure in excess of the predetermined value.

3. A control valve according to claim 2, comprising another effective area on said application means opposed to said first named area and subjected to the applied fluid pressure.

4. A control valve according to claim 3, wherein said first named area is greater than said other area.

5. A control valve according to claim 2, wherein said resiliently urged means includes piston means movable in said housing, passage means extending through said piston means and subjected to the control fluid pressure, said valve means being positioned to control said passage means, and resilient means drivingly engaged between said piston means and application means, said piston means being initially movable in response to the control fluid pressure less than the predetermined value acting thereon against said resilient means to drivingly actuate said application means and establish the applied fluid pressure in the first named predetermined ratio and said piston means being thereafter further movable in response to control fluid pressure in excess of the predetermined value acting thereon toward a passage means opening position engaging said valve means with said relay means and metering the control fluid pressure to said area to establish the assisting force and effect the further actuation of said application means.

6. A control valve according to claim 5, comprising a valve seat on said piston means about said passage means for engagement with said valve means, said valve means being normally urged into engagement with said valve seat to isolate the control fluid pressure from said area, said piston means being movable in response to the control fluid pressure in excess of the predetermined value acting thereon toward its passage means opening position disengaging said valve seat from said valve means when said valve means is engaged with said relay means.

7. A control valve according to claim 5, comprising a pair of opposed areas on said piston means respectively subjected to the control fluid pressure and the metered control fluid pressure acting on said first named area.

8. A control valve according to claim 7, wherein one of said opposed area pairs subjected to the metered control fluid pressure acting on said first named area being greater than the other of said opposed area pairs.

9. A control valve according to claim 2, wherein said application means includes piston means movable in said housing in driven engagement with said resiliently urged means, a chamber in said housing between said piston means and resiliently urged means for subjection to the metered control fluid pressure, said area being on said piston means in said chamber, and other valve means in said housing for engagement with said piston means controlling communication between the supplied and applied fluid pressures, said piston means being initially driven by said resiliently urged means in response to the control fluid pressure less than the predetermined value acting threon to engage and move said other valve means toward a position establishing the applied fluid pressure in the first named predetermined ratio and said piston means being thereafter further driven upon the establishment of the assisting force to actuate said other valve means and establish the applied fluid pressure in the other predetermined ratio.

10. A control valve comprising a housing having inlet, outlet and control ports therein, valve means movable in said housing controlling pressure fluid communication between said inlet and outlet ports, relay means movable in said housing for actuating engagement with said valve means, metering means defining with said relay means an expansible fluid pressure chamber therebetween and movable in said housing for controlling pressure fluid communication between said control port and said chamber, resilient means engaged between said metering and relay means, said metering means being initially movable in response to fluid pressure less than a predetermined value at said control port acting thereon against said resilient means to drive said relay means into engagement with said valve means and move said valve means toward a position effecting pressure fluid communication between said inlet and outlet ports and establishing fluid pressure at said outlet port in a predetermined ratio with that at said control port less than the predetermined value, and an effective area on said relay means in said chamber for subjection to fluid pressure therein, said metering means being further actuated in response to fluid pressure in excess of the predetermined value at said control port acting thereon toward a metering position effecting pressure fluid communicating between said control port and said chamber and establishing a metered control fluid pressure in said chamber acting on said area to create an assisting force further actuating said relay means to increase the established fluid pressure at said outlet port in another predetermined ratio with the fluid pressure in excess of the predetermined value at said control port.

11. A control valve according to claim 10, wherein said metering means includes piston means movable in said housing and defining with said relay means said chamber, said resilient means being engaged with said piston means, a pair of opposed areas on said piston means for respective subjection to the fluid pressure at said control port and the metered control fluid pressure in said chamber, passage means in said piston means between said control port and said chamber, other valve means positioned to control said passage means, said piston means being initially movable against said resilient means in response to the fluid pressure less than the predetermined value at said control port acting on one of said area pairs to drive said relay means and actuate said first named valve means to establish the fluid pressure at said outlet port in the first named predetermined ratio and said piston means being thereafter further movable against said resilient means in response to the fluid pressure in excess of the predetermined value acting on said one of said area pairs toward a passage means opening position to establish the metered control fluid pressure in said chamber acting on said first named area to create the assisting force.

12. A control valve according to claim 11, wherein said one of said area pairs is greater than the other of said area pairs.

13. A control valve according to claim 12, wherein said resilient means includes a spring disposed within said chamber and having opposed end portions in biasing engagement with said metering and relay means.

14. A control valve according to claim 10, wherein said relay means includes piston means novable in said housing and defining with said metering means said chamber, said resilient means being engaged with said piston means and said area being on said piston means, extension means on said piston means for actuating engagement with said valve means.

15. A control valve according to claim 14, comprising another area on said piston means opposed to said first named area and subjected to the established fluid pressure at said outlet port.

16. A control valve according to claim 14, wherein said metering means includes other piston means movable in said housing and defining with said first named piston means said chamber, said resilient means including spring means engaged between said first named and other piston means within said chamber, a pair of opposed areas on said other piston means for respective subjection to the fluid pressure at said control port and the metered control fluid pressure in said chamber, passage means in said other piston means between said control port and said chamber, other valve means in said other piston means and positioned to control said passage means, said other piston means being initially movable against said spring means in response to the fluid pressure less than the predetermined value at said control port acting on one of said area pairs to drive said first named piston and engage said extension means with said first named valve means effecting the actuation thereof to establish the fluid pressure at said outlet port in the first named predetermined ratio with the fluid pressure less than the predetermined value at said control port, other extension means on said first named piston means for engagement with said other valve means, said other piston means also being further movable against said spring means in response to the fluid pressure in excess of the predetermined value at said control port acting on said one of said area pairs toward a passage means opening position engaging said other valve means with said other extension means to establish the metered control fluid pressure in said chamber acting on said first named area to create the assisting force.

17. A control valve comprising a housing having inlet, outlet and control ports therein, a valve movable in said housing controlling communication between said inlet and outlet ports, a piston movable in said housing for actuating said valve, a differential piston movable in said housing and defining with said first named piston an expansible fluid pressure chamber therebetween including larger and smaller surfaces respectively presented to said control port and chamber, a spring biased between said first named and differential pistons, said differential piston being initially movable against said spring in response to fluid pressure less than a predetermined value delivered to said control port to drive said first named piston into engagement with said valve means and actuate said valve means toward a position establishing fluid pressure at said outlet port in a predetermined ratio with the fluid pressure less than the predetermined value delivered to said control port, a passage through said differential piston communicating said control port and chamber, a valve positioned to control said passage, said differential piston being further movable against said spring in response to fluid pressure in excess of the predetermined value delivered to said control port toward a passage opening position to establish a reduced control fluid pressure in said chamber, and another surface on said first named piston presented to said chamber, the reduced control fluid pressure in said chamber acting on said other surface to establish an assisting force further actuating said first named piston and valve to increase the established fluid pressure at said outlet port in another predetermined ratio with the fluid pressure in excess of the predetermined value delivered to said control port.

* * * * *

UNITED STATES PATENT OFFICE
CERTIFICATE OF CORRECTION

Patent No.    3,770,019                Dated   November 6, 1973

Inventor(s)   Raymond F. Stelzer

It is certified that error appears in the above-identified patent and that said Letters Patent are hereby corrected as shown below:

Column 1, line 26, delete "brakes" and insert -- brake torque redistribution, front axle brakes --; line 57, "disadvantages" should read -- disadvantageous --. Column 2, line 22, "stud" should read -- studs --. Column 3, line 29, "pression" should read -- pressive --; line 41, "subject" should read -- subjected --. Column 4, line 11, "of" should read -- or --; line 34, "[P $(A_2 + A_5)/A_4$" should read -- [P $(A_2 + A_5)]/A_4$ --; line 50, "valve" should read -- value --. Column 5, line 22, "[P $(A_2 + A_5)$ + Pr $(A_3 - A_1)/A_4]$" should read -- [P $(A_2 + A_5)$ + Pr $(A_3 - A_1)]/A_4$ --. Column 6, line 20, "which" should read -- with --. Column 7, line 27, "threon" should read -- thereon --; line 60, "communicating" should read -- communication --.

Signed and sealed this 6th day of August 1974.

(SEAL)
Attest:

McCOY M. GIBSON, JR.          C. MARSHALL DANN
Attesting Officer             Commissioner of Patents